US012410696B2

(12) United States Patent
Wang et al.

(10) Patent No.: US 12,410,696 B2
(45) Date of Patent: Sep. 9, 2025

(54) COMPACT WELL TESTING (CWT) SYSTEM AND METHOD OF USE FOR WET GAS WELLS

(71) Applicant: MSI Energy, Inc., Tulsa, OK (US)

(72) Inventors: Shoubo Wang, Tulsa, OK (US); Ahmed Almuraikhi, Al Khobar (SA)

(73) Assignee: MSI Energy, Inc., Tulsa, OK (US)

( * ) Notice: Subject to any disclaimer, the term of this patent is extended or adjusted under 35 U.S.C. 154(b) by 0 days.

(21) Appl. No.: 18/513,883

(22) Filed: Nov. 20, 2023

(65) Prior Publication Data
US 2025/0163792 A1 May 22, 2025

(51) Int. Cl.
*E21B 43/34* (2006.01)
*G01N 1/40* (2006.01)

(52) U.S. Cl.
CPC ........... *E21B 43/35* (2020.05); *G01N 1/4077* (2013.01); *G01N 2001/4083* (2013.01)

(58) Field of Classification Search
CPC ............... E21B 43/35; G01N 1/4077; G01N 2001/4083
See application file for complete search history.

(56) References Cited

U.S. PATENT DOCUMENTS

| | | |
|---|---|---|
| 4,778,443 A | 10/1988 | Sand et al. |
| 4,948,393 A | 8/1990 | Hodson et al. |
| 5,302,294 A | 4/1994 | Schubert et al. |
| 5,507,958 A | 4/1996 | White-Stevens |
| 6,032,747 A | 3/2000 | Moody et al. |
| 6,132,494 A | 10/2000 | Kjos et al. |
| 6,197,095 B1 | 3/2001 | Ditria et al. |
| 6,234,258 B1 | 5/2001 | Karigan |
| 7,854,849 B2 | 12/2010 | Wang et al. |
| 2003/0168391 A1* | 9/2003 | Tveiten .................. E21B 43/36 96/155 |

(Continued)

FOREIGN PATENT DOCUMENTS

| | | | |
|---|---|---|---|
| CN | 114658388 A | * | 6/2022 |
| CN | 116988775 A | * | 11/2023 |

(Continued)

OTHER PUBLICATIONS

International Search Report and Written Opinion from Corresponding PCT Patent Application PCT/US2024/053148 Mailed Jan. 22, 2025; Korean Intellectual Property Office.

*Primary Examiner* — Crystal J Lee
(74) *Attorney, Agent, or Firm* — Head, Johnson, Kachigian &Wilkinson, PC

(57) ABSTRACT

A cyclonic system and method for gas-liquid-solid separation is provided. The system may comprise a Gas-Liquid Cylindrical Cyclone (GLCC) for gas-liquid separation, a cyclone for solid particle separation, and a cyclone for droplet separation. The GLCC may have a vertical churn flow coalescer and a horizontal inlet with an internal inclined flow diverting plate to direct the flow tangentially to the GLCC. The cyclone with a horizontal tangential inlet for solid separation may be installed at the lower section of the vertical churn flow coalescer. Solid particles may be collected at the bottom and discharged. The cyclone for droplet separation may be installed at the upper section of the GLCC. Liquid may be collected in the annulus and drained to the lower section of the GLCC.

4 Claims, 6 Drawing Sheets

(56) References Cited

U.S. PATENT DOCUMENTS

2011/0036239 A1    2/2011  Sarshar et al.
2012/0312754 A1   12/2012  Eriksson et al.
2019/0381427 A1*  12/2019  Magnus ............ B01D 19/0068
2020/0141221 A1*   5/2020  Malone .................. B01D 17/00
2023/0384133 A1*  11/2023  Reasoner ................ G01F 23/18

FOREIGN PATENT DOCUMENTS

| EP | 3584404 A1 | 12/2019 |
| WO | 1992019352 A1 | 11/1992 |
| WO | 1997040903 A1 | 11/1997 |
| WO | 2003033872 A1 | 4/2003 |
| WO | 2004007908 A1 | 1/2004 |

* cited by examiner

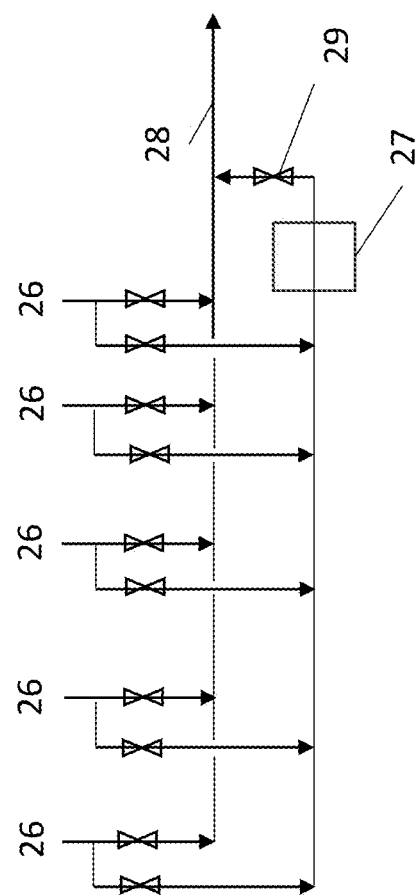

COMPACT WELL TESTING (CWT) SYSTEM AND METHOD OF USE FOR WET GAS WELLS

CROSS REFERENCE

Not Applicable.

BACKGROUND OF THE INVENTION

Field of the Invention

This invention relates generally to a surface well testing system used to measure oil and gas well production rates at the wellhead or downstream of the production manifold.

Description of the Related Art

A surface well testing system is typically used to measure oil and gas well producing rates for oil, gas, and water at the wellhead or downstream of the production manifold. A conventional well test separator uses a horizontal three-phase separator to separate oil, gas, and water. Individual flow meters then measure the gas, oil, and water producing rate from the well. The measurement uncertainty is typically about 5% for each of the phases, namely gas, oil, and water. It requires a well testing crew, which must work 24 hour shifts to operate and conduct the well testing task. It also requires a long rig-up and rig-down time. Thus, the conventional well test separator has low efficiency and high costs.

Multiphase flow meters (MPFM) are a new technology developed in the past 25 years. It is installed at the wellhead for real-time well production monitoring or measurements. Some of the MPFM technologies perform well for oil wells but perform poorly for wet gas wells. It usually has high measurement uncertainty, from 5-20%, and thus is not recommended for highly accurate well testing operations.

Based on the foregoing, it is desirable to provide a compact well testing system that serves as a multiphases flow meter that incorporates a compact two-phase cyclone separator for accurate measurements.

SUMMARY OF THE INVENTION

In general, in a first aspect, the invention relates to a compact well testing system comprising a two-phase cyclone separator capable of separating a gas-liquid-sand flow into a gas stream, a liquid stream, and a solid stream; a gas mass flow meter capable of measuring the gas stream; a liquid mass flow meter capable of measuring the liquid stream; and a sand measurer capable of measuring the solid stream.

The two-phase cyclone separator may comprise a solid separation cyclone and a gas cyclone. The compact well testing system may further comprise a microwave water cut meter, a gas control valve, and/or a liquid control valve.

In a second aspect, the invention relates to a method of measuring oil and gas well producing rates, the method comprising: separating a gas-liquid-sand flow into a gas stream, a liquid stream, and a solid stream via a solid separation cyclone and a gas-liquid two-phase cyclone separator; measuring the gas stream via a gas mass flow meter; measuring the liquid stream via a liquid mass flow meter; and measuring the solid stream via a solid concentration measurement device.

Separating the gas-liquid-sand flow into the gas stream, the liquid stream, and the solid stream may comprise: allowing the gas-liquid-sand flow to enter a solid separation cyclone; generating strong centrifugal force with the solid separation cyclone to separate solid particles into an annulus through an tangential opening slot of the solid cyclone wall; collecting the solid particles at a bottom of the solid separation cyclone; draining the solid particles to produce the solid stream; allowing a gas-liquid phase from the solid separation cyclone to enter a vertical churn flow coalescer before passing through a horizontal inlet section to enter a gas-liquid separation chamber of a gas-liquid cyclone; allowing the gas-liquid phase to enter a demisting cyclone of the gas-liquid cyclone; generating strong centrifugal force with the demisting cyclone to separate liquid droplets into an annulus through an tangential opening slot of the demisting cyclone wall; draining the accumulated liquid in the annulus into the gas-liquid separation chamber; allowing the liquid in the gas-liquid separation chamber to exit the two-phase cyclone separator via a liquid stream outlet to produce the liquid stream; and allowing gas to exit the two-phase separator via a gas stream outlet located at a top of the liquid droplet separation cyclone to produce the gas stream.

The method may further comprise passing the liquid stream through a microwave water cut meter after measuring the liquid stream via the liquid mass flow meter.

The method may further comprise rejoining the gas stream, the liquid stream, and the solid stream into a gas-liquid-sand output.

BRIEF DESCRIPTION OF THE DRAWINGS

FIG. 3 is a schematic diagram of the location of the well testing system relative to multiple wellheads;

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

Figure 2:
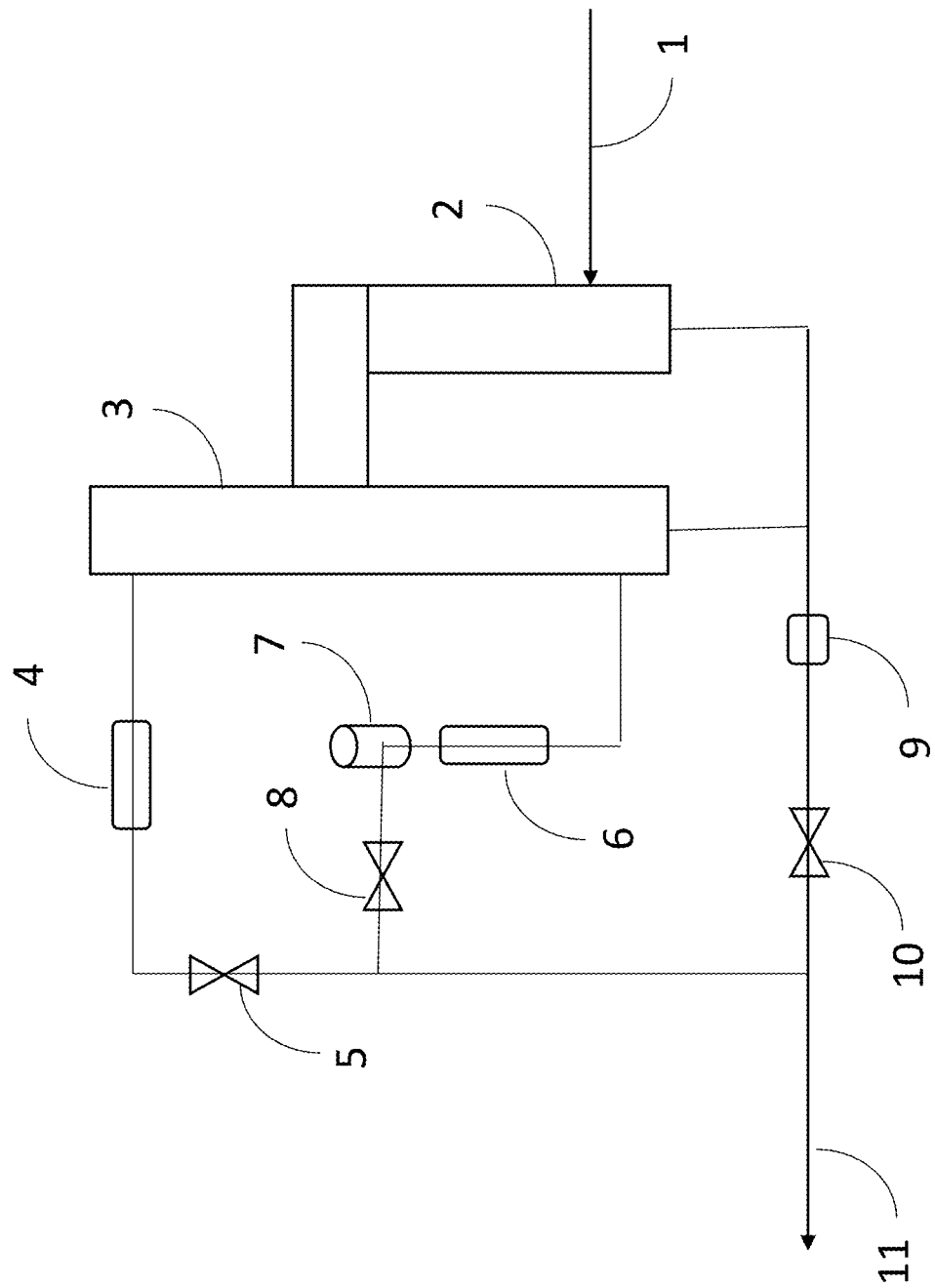
FIG. 2 is a schematic diagram of the well testing system of the present invention.
Figure 5:
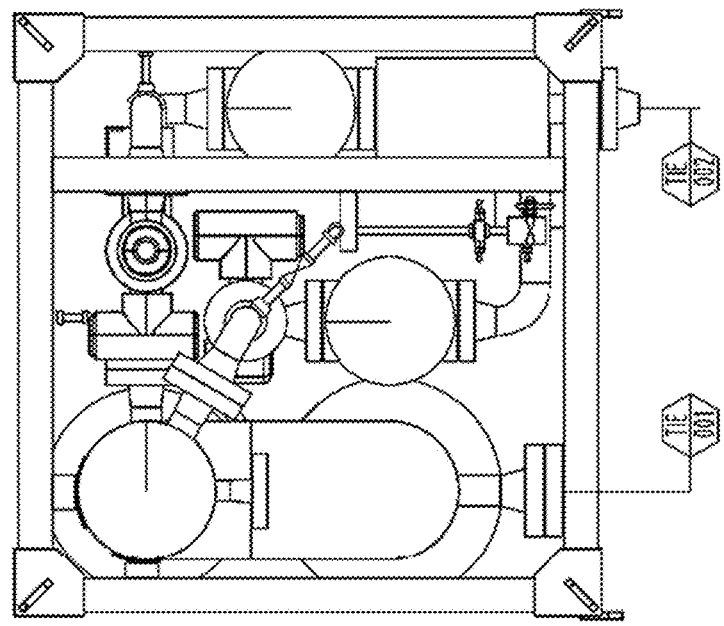
FIG. 5 is a top view of the well testing system.
Figure 4:
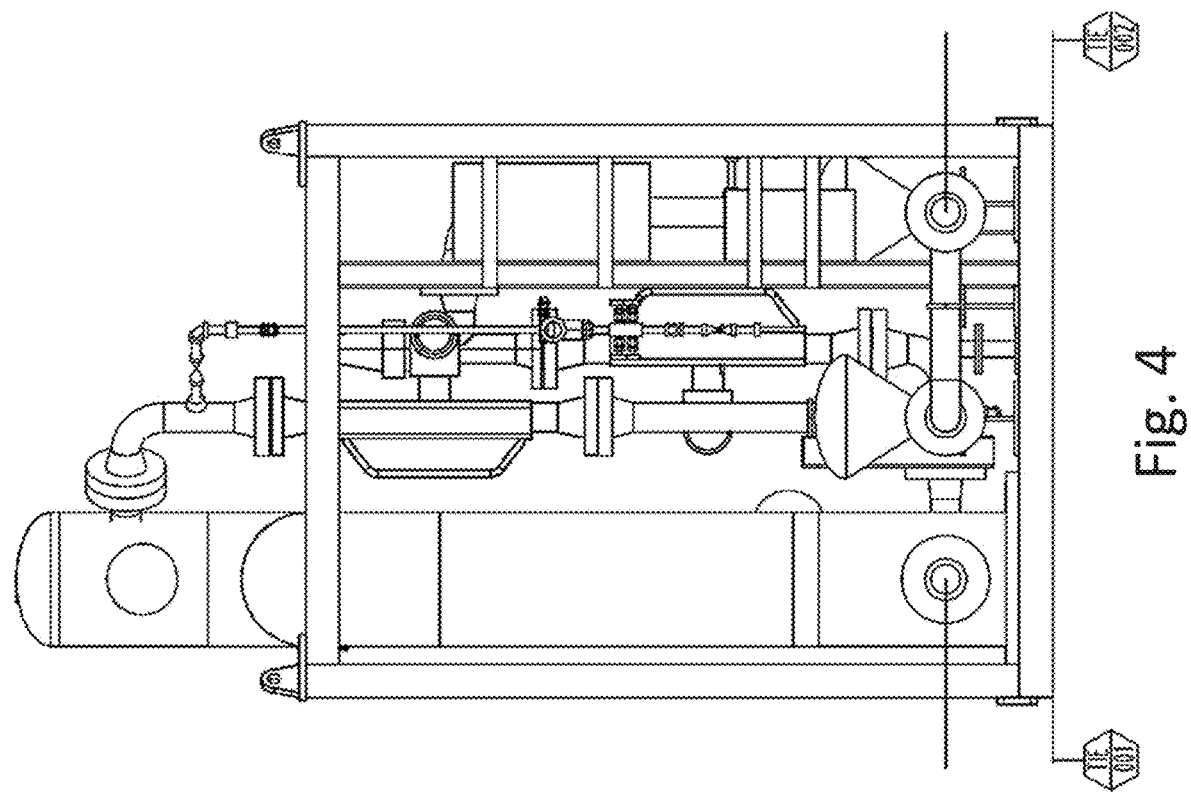
FIG. 4 is a side view of the well testing system.
Figure 6:
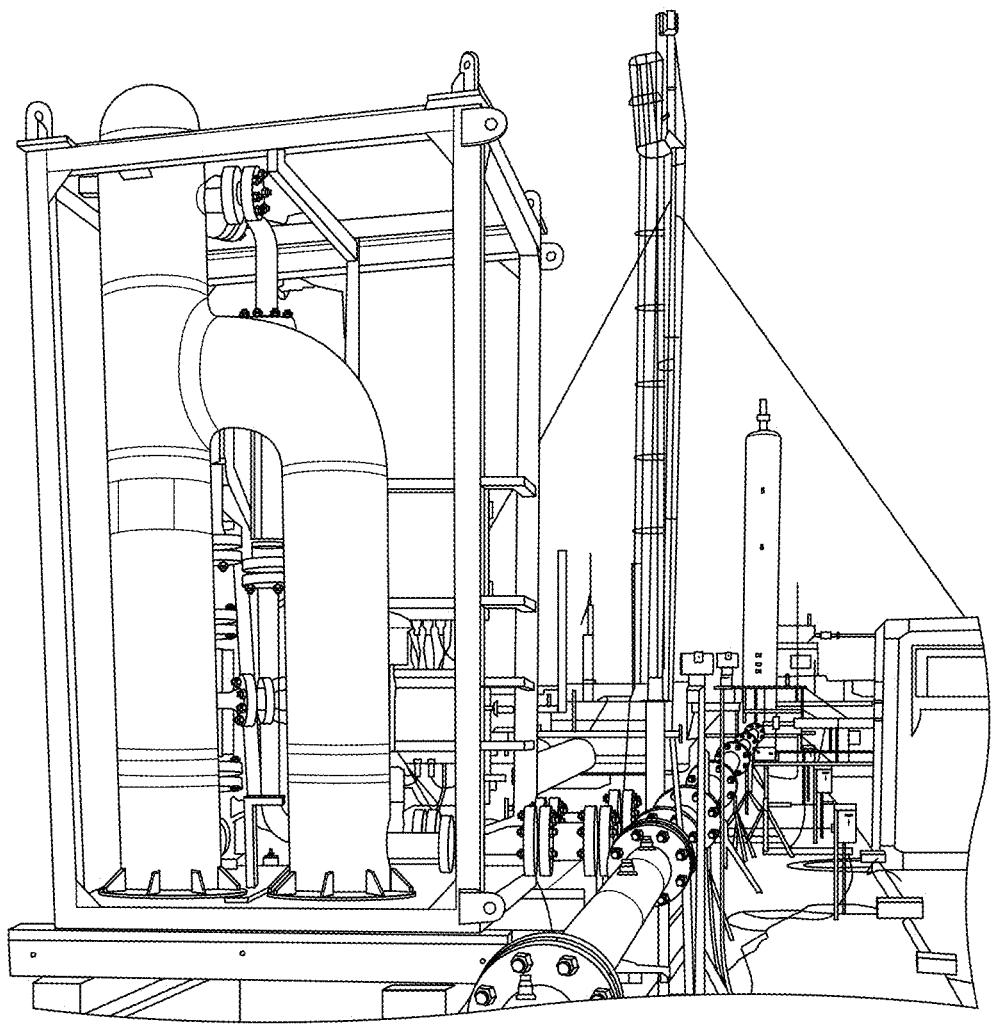
FIG. 6 is a photo of a constructed skid of the present invention.

In general, in a first aspect, the invention relates to a compact well testing system. As seen in FIG. 2, gas-liquid-sand flow from oil/gas wells may enter the system via a gas liquid-sand inlet 1 and be sent to a sand cyclone 2 for sand separation. Sand may accumulate at the bottom of the sand cyclone 2 and may be drained periodically by controlling an on-off valve 10. Sand volume may be measured by a sand measurement 9 and discharged to a gas-liquid sand outlet 11.

Gas may be separated in a gas-liquid cyclone 3 and measured by a gas mass flow meter 4, while liquid may be measured by a liquid mass flow meter 6 before passing through a microwave water cut meter 7. A gas control valve 5 and liquid control valve 8 may be used to control the liquid interface in the gas-liquid cyclone 3 with minimum pressure drop. The gas and liquid may then exit the system via the gas-liquid-sand outlet 11.

A flow computer may be used to collect data from the gas, liquid, and sand measurements to compute the volumetric rates based on the fluids properties and operating pressure and temperature.

Figure 1:
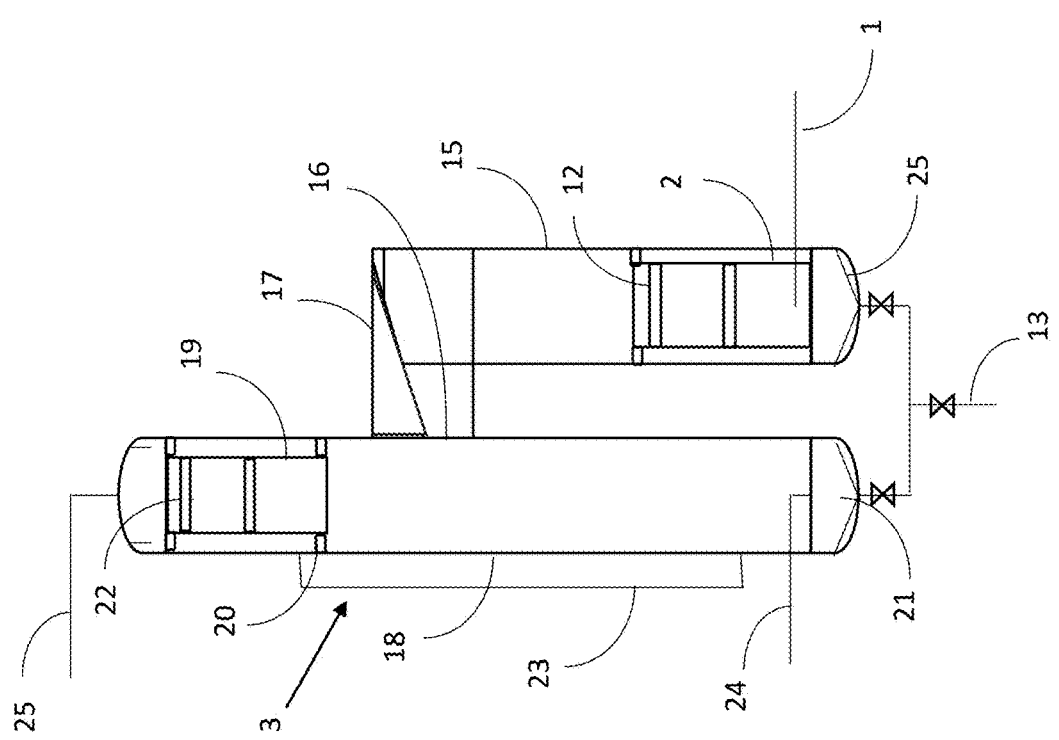
FIG. 1 is a schematic diagram of the two-phase cyclone separator of the present invention.

FIG. 1 illustrates more details of the two-phase separator. As shown, the multiphase flow stream with low concentration of the solid particles may enter the solid separation cyclone 2 tangentially from the inlet 1. High swirling flow may generate strong centrifugal force, which may push solid particles toward the cyclone wall, then to the annulus through an opening slot 12. Solid particles may be collected at the bottom and drained via the solid outlet 13. A vortex breaker 14 may be installed at the bottom to prevent erosion.

Gas-liquid phases from the solid separation cyclone 2 may enter the vertical churn flow coalescer 15, in which the flow velocity may be drastically reduced to promote droplets and bubbles coalescence.

A horizontal inlet section may comprise a 90-degree tee 16 in conjunction with the gas-liquid cyclone 3. A flow divert plate 17 may be installed internally to direct the flow downward and tangentially to the gas-liquid cyclone 3.

The gas-liquid cyclone 3 may comprise a gas-liquid separation chamber 18 in the middle, a droplet separation cyclone 19 in the upper part supported by a support sitting ring 20, and a secondary sand accumulation chamber 21 in the bottom. The liquid droplet separation cyclone 19 may separate liquid droplets from the gas stream, allowing the liquid to exit the liquid droplet separation cyclone 19 via a pipe opening slot 22 and accumulate in the annulus before draining to the bottom of the gas-liquid separation chamber 18 via tube 23.

Liquid may exit the system via a liquid stream outlet 24 located at the bottom of the gas-liquid separation chamber 18, gas may exit the system via a gas stream outlet 25 located at the top of the liquid droplet separation cyclone 19, and solids may exit the system via the solid outlet 13 located at the bottom of the solid separation cyclone 2 and/or the bottom of the gas-liquid cyclone 3.

The compact well testing system may be installed at the wellhead or downstream of the production manifold. As seen in FIG. 3, multiple wells 26 may utilize a single compact well testing system 27. A plurality of valves 28 may determine whether flow from each well travels through the well testing system 27 or directly into the production flow line 28, or both. The output from the well testing system 27 may reenter the production flow line 28 via valve 29.

Figure 7:
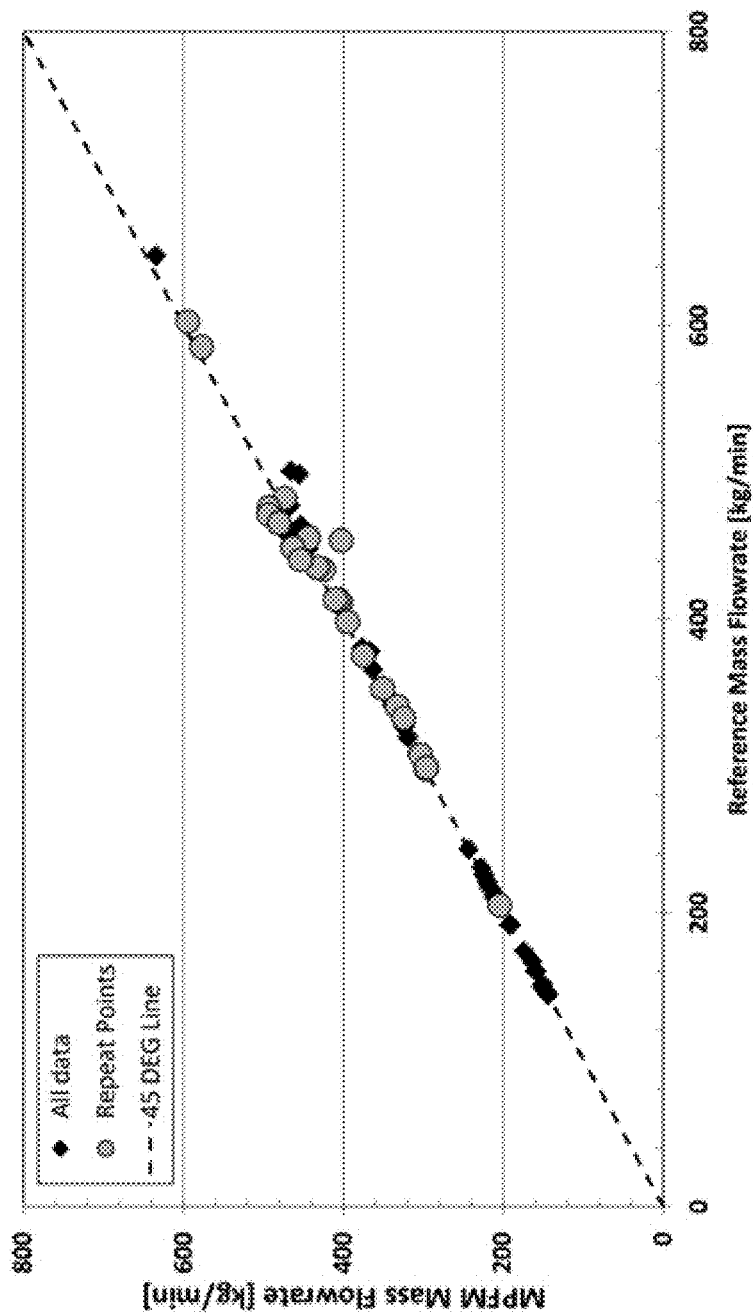
FIG. 7 is a graph of the test results of performance of the present invention.

The system was constructed and tested by a third-party wet gas flow loop using natural gas, condensate oil, and saline water. The test conditions included a pressure of 800 psi, a gas flow rate ranging from 5 to 25 MMscfd, a liquid flow rate ranging from 500 to 4,500 bbl/s, and a water cut range of 0 to 100%. The results, shown in FIG. 7, show that high accurate gas mass flow rate performance and the liquid mass flow rate performance are achieved with average bias errors of −0.35% and 1.1% respectively.

Whereas, the devices and methods have been described in relation to the drawings and claims, it should be understood that other and further modifications, apart from those shown or suggested herein, may be made within the spirit and scope of this invention.

What is claimed is:

1. A method of measuring oil and gas well producing rates, the method comprising:
    separating a gas-liquid-sand flow into a gas stream, a liquid stream, and a solid stream via two-phase cyclone separators;
    measuring the gas stream via a gas mass flow meter;
    measuring the liquid stream via a liquid mass flow meter;
    measuring the solid stream via a solid concentration measurement device;
    allowing the gas-liquid-sand flow to enter a solid separation cyclone; and
    allowing a gas-liquid phase from the solid separation cyclone to enter a vertical churn flow coalescer before passing through a horizontal inlet section to enter a gas-liquid separation chamber of a gas-liquid cyclone.

2. The method of claim 1 where separating the gas-liquid-sand flow into the gas stream, the liquid stream, and the solid stream comprises:
    generating centrifugal force with the solid separation cyclone to push solid particles toward a wall of the solid separation cyclone, then through a first opening slot and into a first annulus;
    collecting the solid particles at a bottom of the solid separation cyclone;
    draining the solid particles via a solid outlet to produce the solid stream;
    allowing the gas-liquid phase to enter a droplet separation cyclone of the gas-liquid cyclone;
    generating centrifugal force with the droplet separation cyclone to push liquid droplets toward a wall of the gas cyclone, then through a second opening slot and into a second annulus;
    draining the accumulated liquid in the second annulus into the gas-liquid separation chamber;
    allowing the liquid in the gas-liquid separation chamber to exit the two-phase separator via a liquid stream outlet to produce the liquid stream; and
    allowing gas to exit the two-phase separator via a gas stream outlet located at a top of the liquid droplet separation cyclone to produce the gas stream.

3. The method of claim 1 further comprising passing the liquid stream through a microwave water cut meter after measuring the liquid stream via the liquid mass flow meter.

4. The method of claim 1 further comprising rejoining the gas stream, the liquid stream, and the solid stream into a gas-liquid-sand output.

* * * * *